United States Patent [19]

Futagawa

[11] Patent Number: 5,754,517
[45] Date of Patent: May 19, 1998

[54] HIGH SPEED INFORMATION READ/WRITE SYSTEM

[76] Inventor: Toshinobu Futagawa, 21-2-503,Higashi-gotanda 5-chome, Shinagawa-ku, Tokyo, Japan

[21] Appl. No.: 670,741

[22] Filed: Jun. 21, 1996

[30] Foreign Application Priority Data

Jun. 23, 1995 [JP] Japan ................................ 7-158091

[51] Int. Cl.⁶ ................................ G11B 17/00; G11B 19/00; G11B 5/004
[52] U.S. Cl. .................... 369/179; 360/87; 360/100.1
[58] Field of Search ............................ 369/179; 360/87, 360/100.1

[56] References Cited

U.S. PATENT DOCUMENTS

| | | |
|---|---|---|
| 2,540,654 | 2/1951 | Cohen et al. . |
| 3,197,750 | 7/1965 | Smith, Jr. . |
| 3,514,771 | 5/1970 | Ehalt et al. . |
| 3,613,059 | 10/1971 | Dirks . |
| 4,470,051 | 9/1984 | Springer . |

FOREIGN PATENT DOCUMENTS

| | | |
|---|---|---|
| 0292578 | 11/1988 | European Pat. Off. . |
| 0293494 | 12/1988 | European Pat. Off. . |
| 0293495 | 12/1988 | European Pat. Off. . |
| 115963 | 10/1961 | Germany . |
| 3810438 | 10/1989 | Germany . |
| 2151066 | 7/1985 | United Kingdom . |

*Primary Examiner*—Stuart S. Levy
*Assistant Examiner*—William J. Klimowicz
*Attorney, Agent, or Firm*—Leydig, Voit & Mayer, Ltd.

[57] ABSTRACT

A high speed information read/write system includes a substantially cylindrical information storing device including at least one storage cylinder having at least one information storage medium thereon. A head device including at least one head cylinder is disposed coaxially with the storage cylinder and has a plurality of head members mounted thereon. An information input/output device outputs information to the information storage medium of the storage cylinder through the head device and inputs the information from the information storage medium through the head device. A drive device rotates the information storing device and effects a relative movement between the information storing device and the head device. Preferably, a plurality of head members are assembled as a head unit, and the head cylinder has head mounting portions with abutment structures which are adapted to mount the head units thereon in such a manner that, when the head units are mounted on the head mounting portions properly to abut against the abutment structures, all of the head members of the head units are disposed in a helical fashion around the information storage medium of the storage cylinder. The head member may be an optical head or magnetic head.

26 Claims, 10 Drawing Sheets

1

HIGH SPEED INFORMATION READ/WRITE SYSTEM

BACKGROUND OF THE INVENTION

1. Field of the Invention

The present invention relates to a high speed information read/write system, and more particularly, it relates to a high speed information read/write system which can be applied to data base systems suitable for multi-access business and which can not only store a large amount of information but also read or retrieve desired information in a very short time.

2. Description of the Related Art

In recent years, there has developed a need for a data base system (filing and delivery system) for accommodating the multi-access businesses. Various read/write apparatuses using a magnetic read/write system or an optical read/write system have been proposed or many attempts utilizing memories have been tried to meet this need.

As various networks have been developed on a worldwide level, a system in which not only a large amount of information can be stored but also desired information can be retrieved in a very short time has greatly been desired. For example, in video-on-demand (VOD) systems, it is necessary to provide a function by which any user can obtain desired information promptly at any time. If such a function is realized, the presently existing arrangement in which only certain information is available to users can be changed to the arrangement in which users can freely select their desired information. Such an arrangement would undoubtedly result in the creation of new industrial fields. In VOD systems, it is highly required that all of the stored data can repeatedly be retrieved or output in every predetermined short cycle. Thus, so long as disk systems are used, the requirements for VOD systems cannot be satisfied. Even if disk array systems are utilized, the access time or retrieval time will increase as the amount of stored information is increased.

SUMMARY OF THE INVENTION

The present invention aims to eliminate the above-mentioned drawbacks of conventional information storage and retrieval systems.

An object of the present invention is to provide an improved high speed information read/write system having an information storing means of cylindrical shape with any user being able to read and write desired information with respect to the information storing means promptly at any time.

To achieve the above objects, according to the present invention, there is provided a high speed information read/write system comprising a substantially cylindrical information storing means including at least one storage cylinder having at least one information storage medium thereon, a head means including at least one head cylinder disposed coaxially with respect to the storage cylinder and having a plurality of head members mounted thereon, an information input/output means for outputting information to the information storage medium of the storage cylinder through the head means and for inputting the information from the information storage medium through the head means, and a drive means for rotating the information storing means and for effecting a relative movement between the information storing means and the head means.

Preferably, the head members are fixedly mounted on the head cylinder in a helical fashion around the circumference of the head cylinder. It is preferable that the information storing means have a plurality of storage cylinders arranged coaxially with each other and connected to each other, and the head means has a plurality of head cylinders with plural head members to cooperate with the respective storage cylinders.

The information storage medium may be formed from a photosensitive layer or coating, and each of the head members may be constituted by a lens and associated optical element or elements. Alternatively, the information storage medium may be formed from a magnetic layer of coating, and each of the head members may be constituted by a magnetic head.

The present invention further provides a high speed information read/write system comprising a substantially cylindrical information storing means including a storage cylinder being provided at its outer peripheral surface with at least one information storage medium, a head means including a head cylinder disposed coaxially with the storage cylinder to surround the latter, and a plurality of head units each having a plurality of head members disposed side by side, the head cylinder being provided at its inner peripheral surface with head mounting portions having abutment means which are adapted to mount the head units thereon in such a manner that, when the head units are mounted on the head mounting portions properly to abut against the abutment means, all of the head members of the head units are disposed in a helical fashion around the information storage medium of the storage cylinder, an information input/output means for outputting information to the information storage medium of the storage cylinder through the head means and for inputting the information from the information storage medium through the head means, and a drive means for rotating the information storing means and for effecting a relative movement between the information storing means and the head means.

Preferably, the head mounting portions are constituted by a plurality of vertical recesses or grooves formed in the inner peripheral surface of the head cylinder and disposed side by side in the circumferential direction, and the head units have housings mounted in the vertical grooves, and the abutment means are provided at lower ends of the vertical grooves.

Preferably, the head units comprise optical lens units each having a plurality of lenses disposed side by side and associated optical elements. Alternatively, the head units may comprise magnetic head units each having a plurality of magnetic heads.

Other object and features will be apparent from the following detailed explanation of the invention with reference to the accompanying drawings.

DESCRIPTION OF THE PREFERRED EMBODIMENTS

The present invention will now be explained in connection with embodiments thereof with reference to the accompanying drawings.

First of all, a first embodiment of high speed information read/write system according to the present invention will be described referring to FIGS. 1 to 8.

Figure 1:
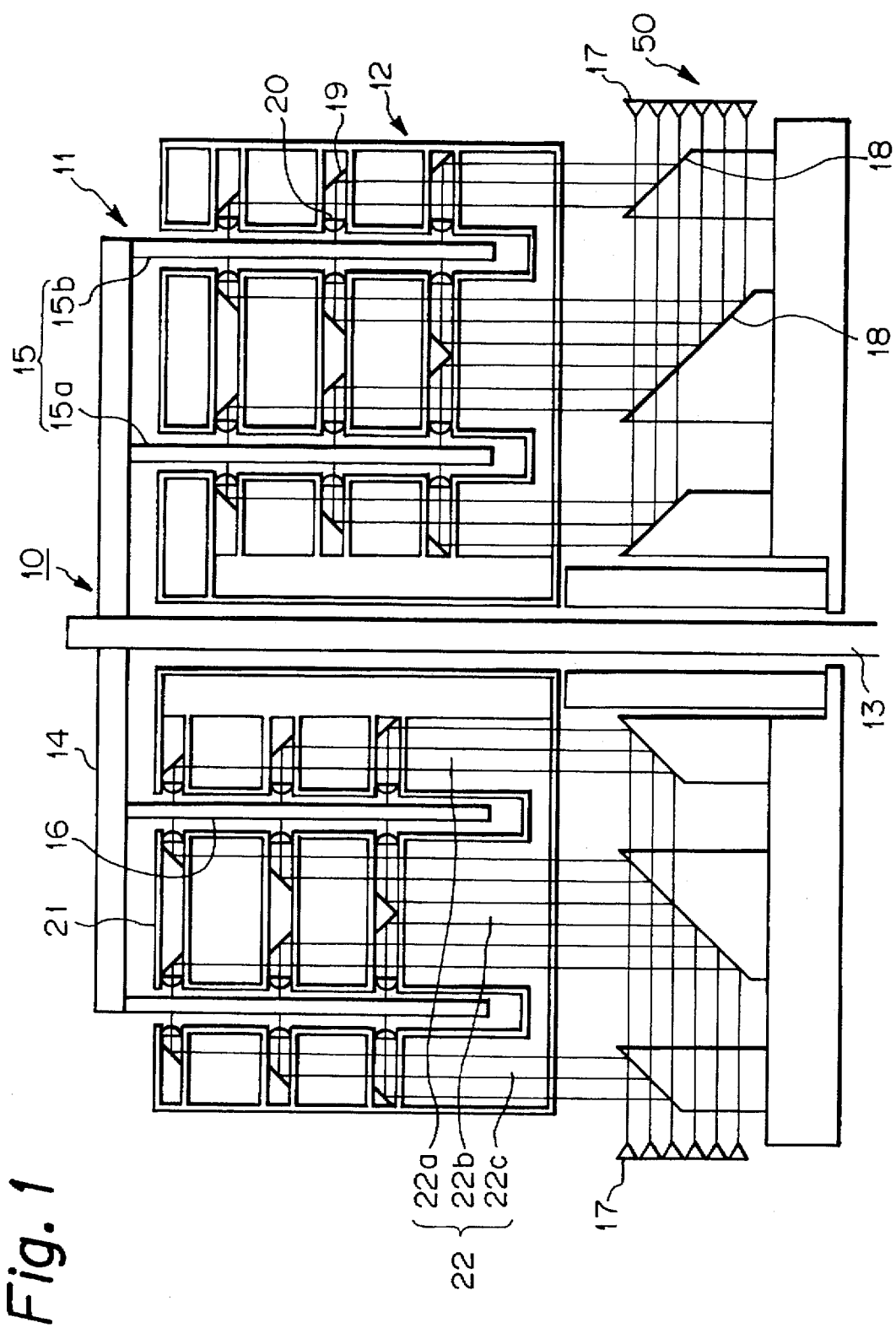
FIG. 1 is a sectional elevation of a first embodiment of a high speed information read/write system according to the present invention.

FIG. 1 shows a portion of a first embodiment of a high speed information read/write system 10 according to the present invention. The high speed information read/write system 10 is of a cylindrical shape and generally comprises a cylindrical information storing portion 11, a head portion 12 for reading and writing information with respect to the information storing portion 11, and an information input/output portion 50. The information storing portion 11 includes a central rotating shaft 13 driven by an appropriate drive means (not shown) such as a motor and having upper and lower end portions rotatably supported by bearings (not shown) for preventing eccentric rotation of the shaft 13, an upper disk plate 14 secured to the shaft 13 for rotation with the shaft 13, and an information storage cylinder assembly 15 secured to or integrally formed with the disk plate 14. In the illustrated embodiment, as shown in FIG. 1, the information storage cylinder assembly 15 includes a first information storage cylinder 15a coaxial with shaft 13 and a second information storage cylinder 15b disposed around and coaxial with the first cylinder 15a and having a diameter greater than that of the first cylinder 15a. Each information storage cylinder 15a or 15b is provided at its inner and outer peripheral surfaces with an information storage medium 16. Since the information storage medium may be of any well-known type, a detailed explanation thereof will be omitted. However, in the first embodiment, each information storage medium 16 is formed from a thin photosensitive layer or coating for use in connection with optical head members of the head portion 12, which will be fully described later. It should be understood that the number of information storage cylinders can be freely changed.

The head portion 12 includes a head cylinder assembly 22. In the illustrated embodiment, the head cylinder assembly 22 includes a first head cylinder 22a disposed within the first information storage cylinder 15a, a second head cylinder 22b disposed between the first and second information storage cylinders 15a and 15b and a third head cylinder 22c disposed around the second information storage cylinder 15b. The head cylinders 22a–22c are coaxial with each other and with the information storage cylinders 15a, 15b.

The head portion 12 further includes a plurality of head members 21 each of which comprises a first mirror surface 19 and an associated objective lens 20. More particularly, the first mirror surface 19 serves to receive information-containing light from the information input/output portion 50 via a second mirror 18 of the information input/output portion and to reflect the information-containing light toward the corresponding objective lens 20, and the objective lens 20 serves to focus the information-containing light onto the photosensitive layer 16 as a light spot having a diameter substantially the same as a width of each of information storing tracks on the photosensitive layer. The first mirror surface 19 and the associated lens 20 can be assembled as a lens/mirror unit which acts as the head member 21 and which will be described later in connection with FIGS. 4 to 8. The lens/mirror units or head members 21 are fixedly mounted on the head cylinders 22a to 22c in such a manner that the lens/mirror units 21 are opposed to the corresponding photosensitive layers 16 on the storage cylinders 15a, 15b.

Figure 2:
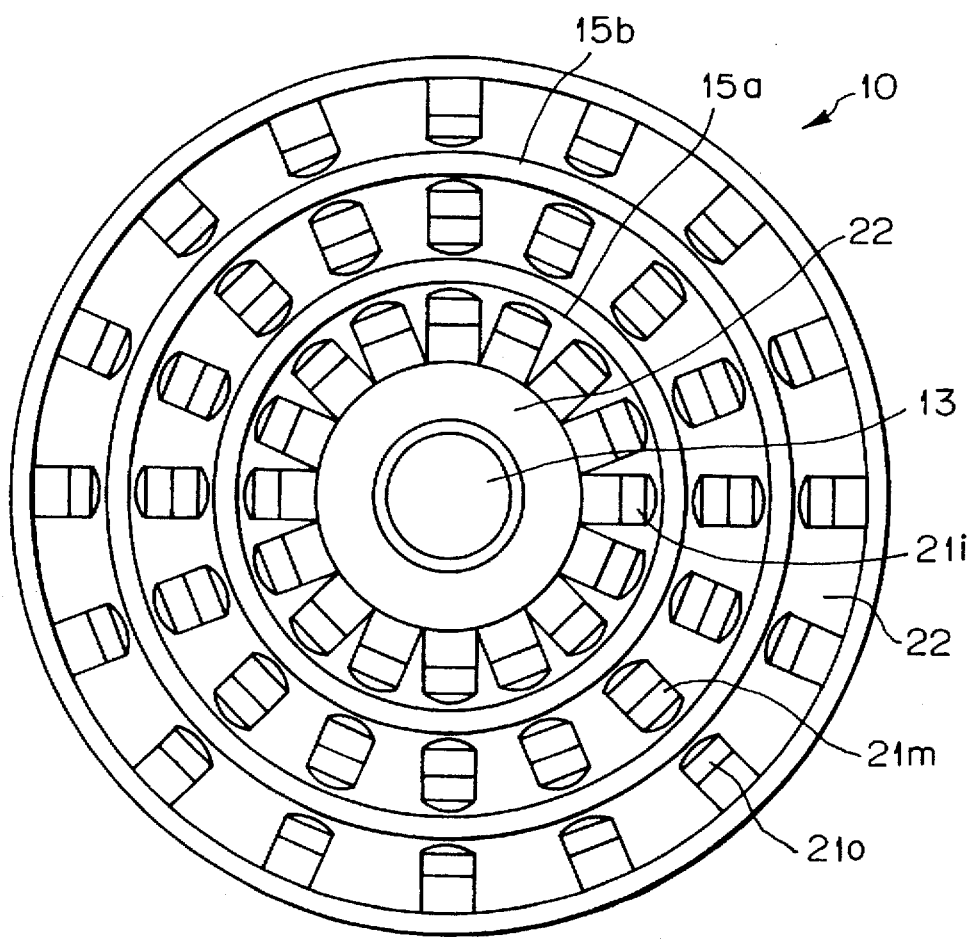
FIG. 2 is a sectional plan view of the high speed information read/write system of FIG. 1, showing a relationship between an information storing portion and a head portion of the system.

FIG. 2 is a plan view showing the relation between the information storage cylinders 15a, 15b and the lens/mirror units 21 of the high speed information read/write system 10. As shown in FIG. 2, the lens/mirror units 21 are mounted on the head cylinders and are disposed in such a manner that the units 21 are perpendicular to the respective information cylinders 15a, 15b in a radial direction. Further, the lens/mirror units 21 are disposed substantially equidistantly in the circumferential direction. As can be seen from FIG. 2, each of the lens/mirror units disposed within the first information storage cylinder 15a has its lens (20) directed radially outwardly. Each of the lens/mirror units 21m disposed between the first and second information storage cylinders 15a, 15b has two lenses (20) directed radially inwardly and outwardly, respectively. Further, each of the lens/mirror units 21o disposed outside of the second information storage cylinder 15b has its lens (20) directed radially inwardly.

While the lens/mirror units 21 are disposed substantially equidistantly in the circumferential direction in FIG. 2, it should be noted that the lens/mirror units are not necessarily disposed equidistantly in the circumferential direction. Further, in FIG. 2, while the lens/mirror units 21i, 21m and 21o aligned with each other in the radial direction, it should be understood that the lens/mirror units 21i, 21m and 21o are not necessarily aligned with each other in the radial direction.

Figure 3:
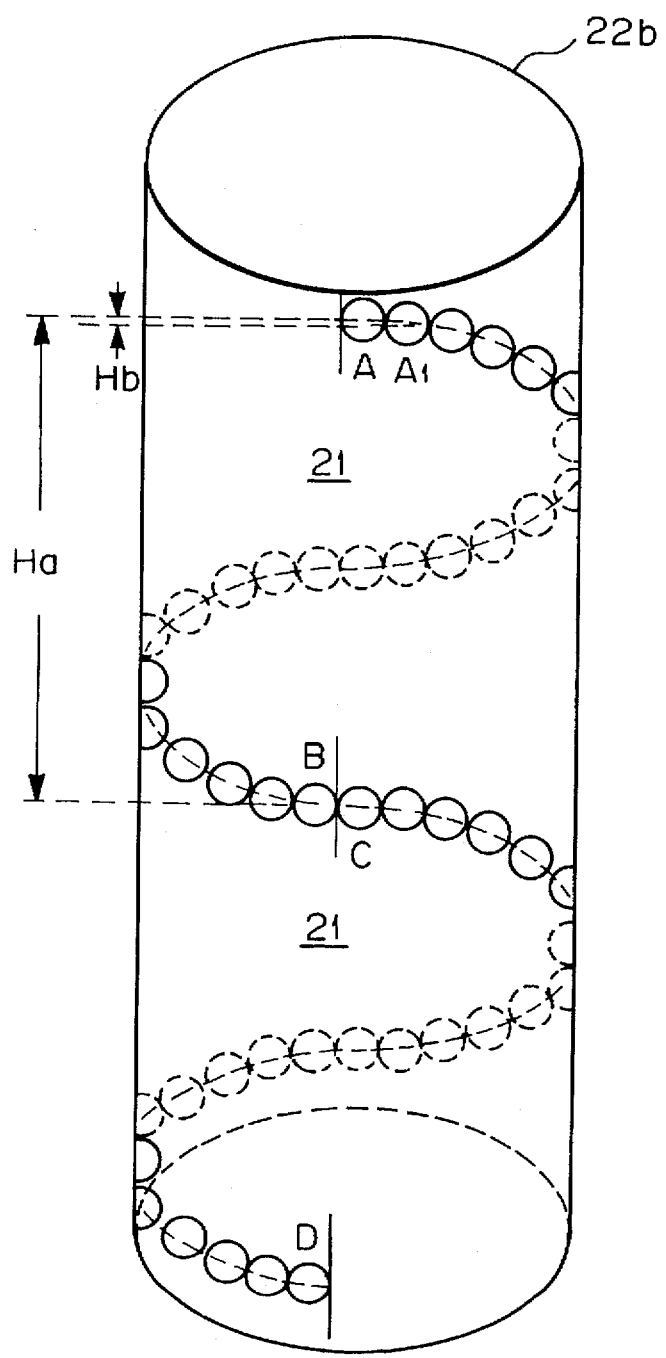
FIG. 3 is a schematic perspective view showing a positional relationship between one of the information storage cylinders of the information storing portion and head members of the head portion of the high speed information read/write system of FIG. 1.

FIG. 3 schematically shows the positional relation between one of the head cylinders (for example, 22b) and the lens/mirror units 21 mounted on this head cylinder 22b. As shown, the lens/mirror units 21 are mounted on the head cylinder in a helical fashion. More particularly, in FIG. 3, the helix starts from an uppermost lens/mirror unit A and terminates at a lens/mirror unit B to surround the head cylinder 22b by one revolution. Then, the helix further starts from a lens/mirror unit C (disposed directly below unit A) and terminates at a lens/mirror unit D (disposed directly below unit B) to surround the head cylinder 22b by one revolution. In this way, the helix extends from unit A to unit D continuously. It should be noted that, although the lens/ mirror units A and C (B and D, and so on) are shown as being spaced apart from each other in the axial direction of the head cylinder by a distance Ha in FIG. 3, it is preferable that the lens/mirror units A and C (B and D, and so on) are disposed closely adjacent to each other in the axial direction. Further, when the axial distance between two lens/mirror units (for example, A and $A_1$) adjacent to each other in the helical direction is Hb, the value of the distance Hb is related to the access time of the desired information on the information storage cylinder assembly, which will be described later. The helical arrangements of the lens/mirror units for other head cylinders are the same as for the above-mentioned head cylinder 22b. The helical arrangement will be defined later.

Figure 4:
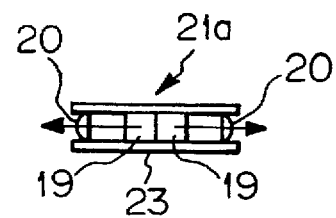
FIG. 4 is a plan view showing an example of a lens/mirror unit comprising the head member.

FIG. 4 shows an example of the lens/mirror unit 21a. In this example, the lens/mirror unit 21a includes a support frame 23 for supporting an inverted triangular mirror (not numbered) having two first mirror surfaces 19 inclined upwardly and outwardly by an angle of 45 degrees (see FIG. 6), and two lenses 20 cooperating with respective ones of the first mirror surfaces 19.

Figure 5:
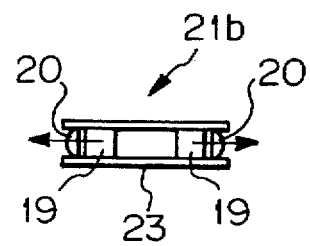
FIG. 5 is a plan view showing another example of a lens/mirror unit comprising the head member.

FIG. 5 shows another example of the lens/mirror unit 21b. In this example, the lens/mirror unit 21b includes a support frame 23 for supporting an inverted trapezoidal mirror (not numbered) having two first mirror surfaces 19 inclined upwardly and outwardly by an angle of 45 degrees (see FIG. 6), and two lenses 20 cooperating with respective ones of the first mirror surfaces 19.

Figure 6:
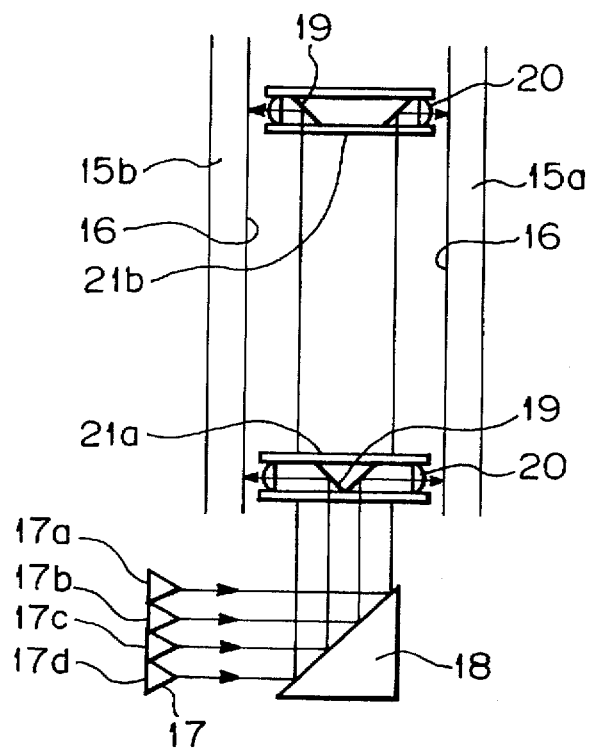
FIG. 6 is a schematic side view for explaining functions of the lens/mirror units shown in FIGS. 4 and 5.

FIG. 6 shows a relation between the lens/mirror units 21a, 21b and information-containing light paths from light emitting elements (such as semiconductor lasers) 17 of the information input/output portion 50 (described later). As can be seen in FIG. 6, the lens/mirror units 21 (21a, 21b) have the same radial length. However, the first mirror surfaces 19 of the lens/mirror units 21a, 21b are offset from each other in the radial direction. Thus, for example, in FIG. 6, information-containing light emitted from an uppermost semiconductor laser 17a in the horizontal direction is reflected by the second mirror 18 of the information input/output portion to advance vertically upwardly. Then, the light passes through an opening and the like (not shown) of the support frame 23 of unit 21a to reach unit 21b. Then, the light is reflected by the right side first mirror surface 19 of unit 21b to be directed to the center of the corresponding lens 20, thereby writing information on the photosensitive layer 16 of information storage cylinder 15a. Similarly, information-containing light emitted from a second semiconductor laser 17b in the horizontal direction is reflected by the second mirror 18 to reach unit 21a. Then, the light is reflected by the right side first mirror surface 19 of unit 21a to be directed to the center of the corresponding lens 20, thereby writing information on information storage cylinder 15a. Information-containing light emitted from a third semiconductor laser 17c in the horizontal direction is reflected by the second mirror 18 to advance vertically upwardly. Then, the light passes through an opening and the like (not shown) of the support frame 23 of unit 21a to reach unit 21b. Then, the light is reflected by the left side first mirror surface 19 of unit 21b to be directed to the center of the corresponding lens 20, thereby writing information on the photosensitive layer 16 of information storage cylinder 15b. Similarly, information-containing light emitted from a fourth semiconductor laser 17d in the horizontal direction is reflected by the second mirror 18 to reach unit 21a. Then, the light is reflected by the left side first mirror surface 19 of unit 21a to be directed to the center of the corresponding lens 20, thereby writing information on the information storage cylinder 15b.

Figure 7:
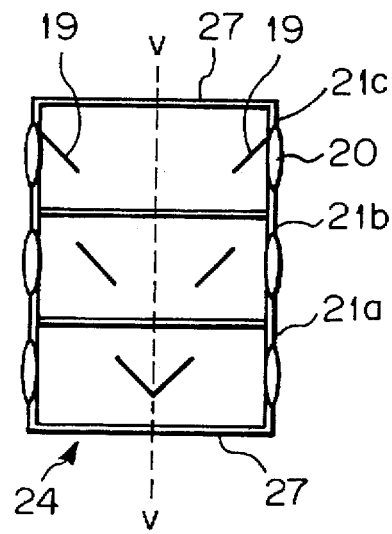
FIG. 7 is a side view showing a further example of a lens/mirror unit comprising the head members.
Figure 8:
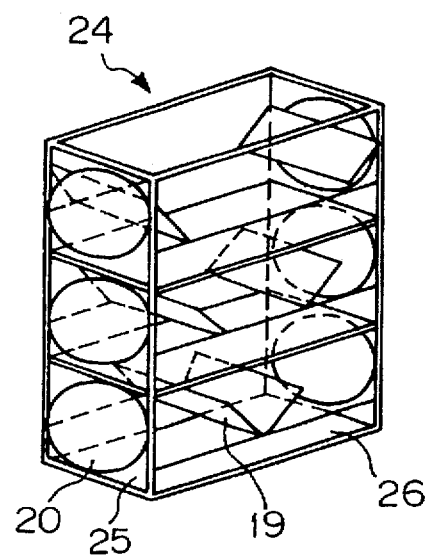
FIG. 8 is a perspective view of the lens/mirror unit of FIG. 7.

FIGS. 7 and 8 show a lens/mirror unit assembly 24 formed by stacking a plurality of the aforementioned lens/mirror units 21 (21a, 21b and 21c in FIG. 7). The first mirror surfaces 19 and the lenses 20 in each lens/mirror unit are disposed symmetrically with respect to a central vertical line v—v. Furthermore, the first mirror surfaces 19 are inclined upwardly and outwardly at an angle of 45 degrees. In addition, the distance between the first mirror surfaces 19 in each unit gradually increases from the lowermost unit (21a in FIG. 7) to the uppermost unit (21c in FIG. 7). With this arrangement, for example, the light sent to a position furthest from the central vertical line v—v is received by the first mirror surface in the uppermost lens/mirror unit 21c, the light sent to a position nearest to the central vertical line is received by the first mirror surface in the lowermost lens/mirror unit 21a, and the light sent to an intermediate position is received by the first mirror surface in the middle lens/mirror unit 21b. In this way, the light emitted from different semiconductor lasers 17 of the information input/output portion 50 can be prevented from being reflected by the same first mirror surface 19. Thus, by arranging the first mirror surfaces 19 properly in accordance with the distance between the laser beams emitted from the semiconductor lasers 17, the light beams received in the lens/mirror units can independently be treated simultaneously.

In FIG. 8, the lens/mirror unit assembly 24 includes lens support plates 25 for supporting the lenses 20 and mirror support plates 26 for interconnecting the lens support plates and for supporting the first mirrors 19. If desired, cross plates 27 (FIG. 7) for closing upper and lower ends of the lens/mirror unit assembly may be provided. In this case, the cross plates 27 are provided with openings or slots (not shown) for permitting the passage of the information-containing light. The mirror support plates 25 are provided at their inner surfaces with mirror mounting portions (not shown) on which the first mirrors 19 are fixedly mounted at the predetermined angle. The plates 25, 26, 27 may be made of plastics, resins, metals or other suitable materials. For the lens/mirror unit 21 disposed inside of information storage cylinder 15a or outside of information storage cylinder 15b, a right half or a left half of the lens/mirror unit 21a shown in FIG. 4 (and 21b in FIG. 5) or of the lens/mirror unit assembly 24 shown in FIG. 7 may be used, for example.

The information input/output portion 50 will next be described. As mentioned above, the information input/output portion 50 includes the semiconductor lasers 17 adapted to emit information-containing laser beams and associated with the corresponding lenses 20 of the lens/mirror units 21, and the plurality of second mirrors 18 each associated with one or more semiconductor lasers 17 and the first mirror surfaces 19 so that the laser beams emitted from the associated semiconductor lasers 17 are reflected by each second mirror 18 to reach the corresponding lenses 20 through the respective first mirror surfaces 19, as already described in connection with FIG. 6. In the illustrated embodiment, the semiconductor lasers 17 are fixedly mounted on a frame (not shown) of the system 10 along vertical and circumferential directions so that the information laser beams emitted from the lasers do not interfere with each other and are received by the corresponding lenses 20 with certainty.

In use, the information storing portion 11 is continuously rotated by the drive means, and, at the same time, the information storing portion 11 and the head portion 12 are shifted upwardly and downwardly relative to each other in the vertical direction. Preferably, the head portion 12 is fixed, and the information storing portion 11 is upwardly and downwardly moved relatively with respect to the stationary head portion 12. The relative movement generating means may be of any well-known type (for example, the back and forth linear movement generating means 117 which will be described later in connection with a third embodiment of the present invention).

Since the reading and writing of information with respect to the information storage layers 16 of the information storing portion 11 is well-known, an explanation thereof will be omitted.

Next, a second embodiment of a high speed information read/write system 30 according to the present invention will be explained with reference to FIG. 9.

In this second embodiment, a plurality (two in FIG. 9) of disk plates 32, 33 are secured to a central rotating shaft 31 (similar to the central rotating shaft 13 in the first embodiment), and a plurality (three in FIG. 9) of information storage cylinders 35, 36, 37 are secured to or integrally formed with the disk plates 32, 33, respectively. As is in the first embodiment, each of the information storage cylinders 35, 36, 37 has information storage layers 34 thereon. The information storage cylinders 35, 36, 37 comprise an information storage cylinder assembly of a cylindrical information storing portion 38 corresponding to the information storage cylinder assembly 15 of the cylindrical information storing portion 11 of the first embodiment. Information-containing laser beams 39 from semiconductor lasers of an information input/output portion are reflected by first mirrors 41 of a head portion 40 similar to that of the first embodiment to reach corresponding lenses 43 via second mirrors 42, thereby focusing the information laser beams onto the information storage layers 34 of the information storage cylinders 35, 36, 37. The operation of this second embodiment of a high speed information read/write system 30 is substantially the same as that of the aforementioned first embodiment.

Figure 9:
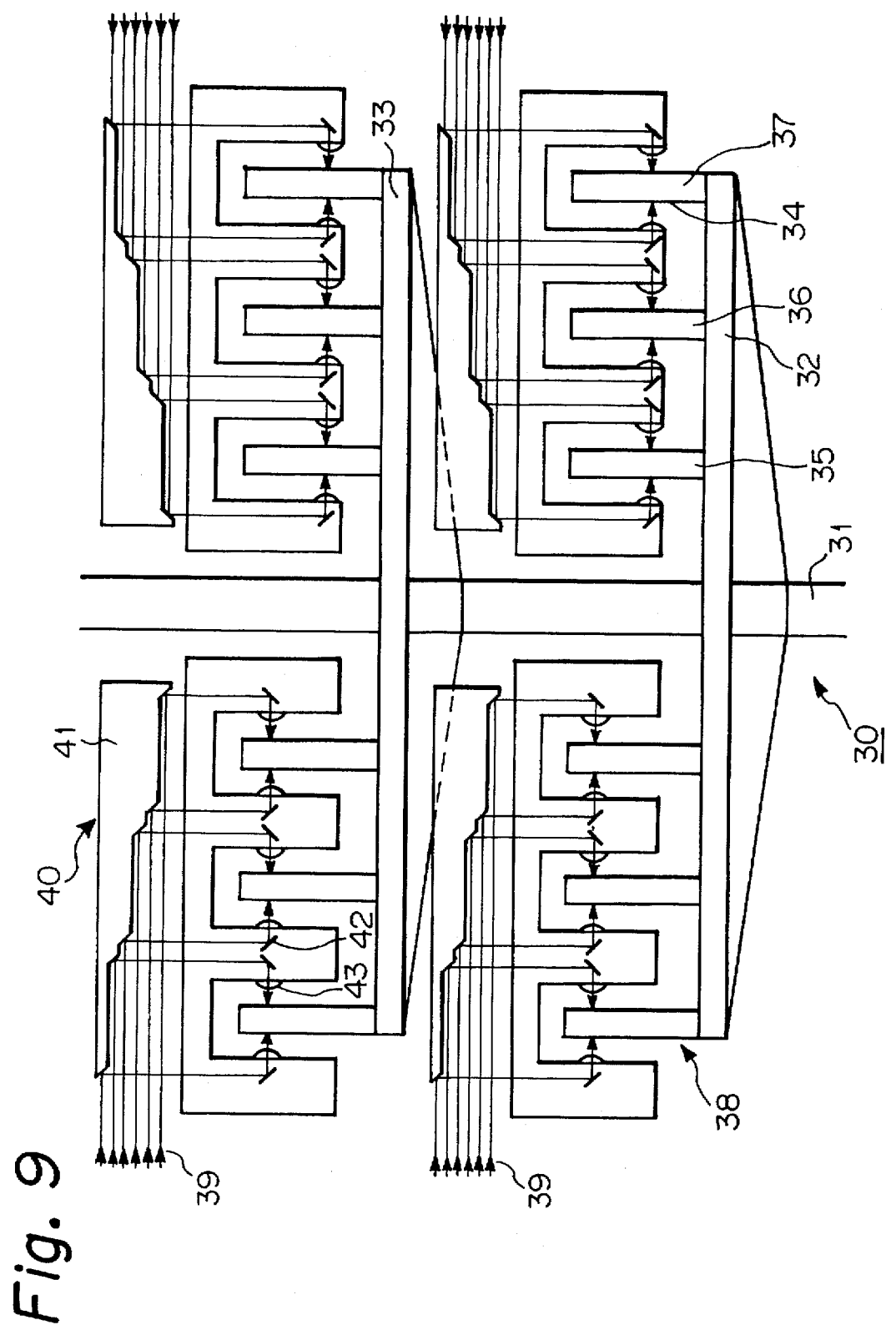
FIG. 9 is a schematic sectional elevation of a second embodiment of a high speed information read/write system according to the present invention.

In FIG. 9, the lens arrangement is only schematically illustrated, and the helical lens arrangement as described in connection with the first embodiment may be used.

Next, a third embodiment of a high speed information read/write system 100 according to the present invention will be explained with reference to FIGS. 10 to 13.

Figure 10:
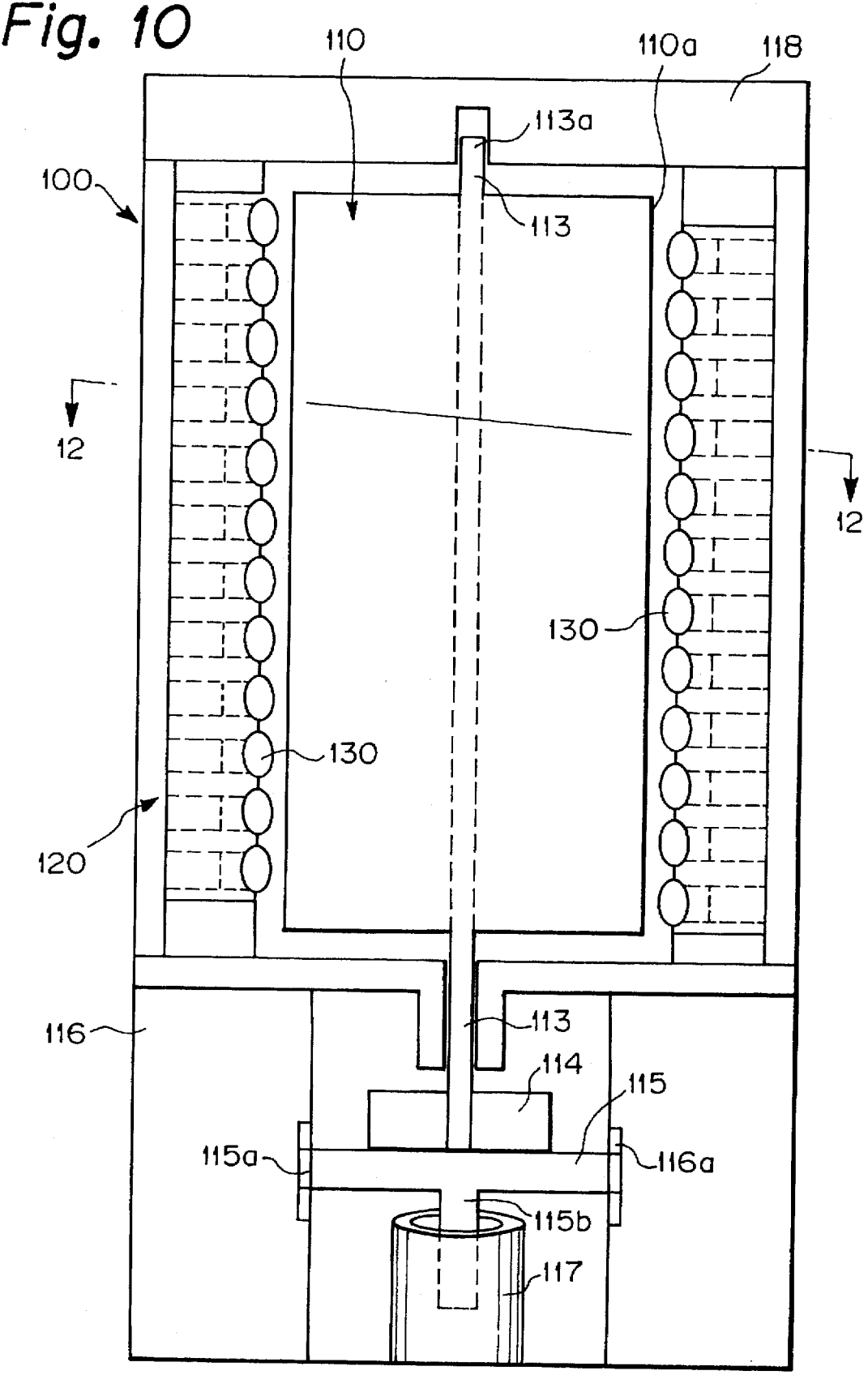
FIG. 10 is a sectional elevation of a third embodiment of a high speed information read/write system according to the present invention.

This embodiment shows a more concrete construction of the present invention. As shown in FIG. 10, this embodiment of a high speed information read/write system 100 comprises a cylindrical information storing portion 110, and a substantially cylindrical head portion 120 disposed coaxially with the cylindrical information storing portion 110 to surround the latter and adapted to read and write information with respect to the cylindrical information storing portion. The cylindrical information storing portion 110 is provided at its outer peripheral surface with a photosensitive information storage medium (layer) 110a. The cylindrical information storing portion 110 can be rotated by means of an appropriate drive means such as a motor 114 around a central rotating shaft 113 to which the cylindrical information storing portion 110 is integrally attached. The motor 114 may be directly connected to the central rotating shaft 113, or it may be connected to the rotating shaft 113 through a gear train (not shown) or other member so that a rotational force from the motor 114 can be transmitted to the shaft 113. Further, in this embodiment, the cylindrical information storing portion 110 is reciprocally moved in an up-and-down direction (vertical direction). To this end, as an example, the motor 114 is secured to a motor support member 115 which can be guided in the vertical direction by keys 115a provided on the motor support member 115 and keyways 116a formed in a stationary or fixed frame 116 of the system 10. A lower extension 115b of the motor support plate 115 is associated with a relative movement generating means 117. The relative movement generating means 117 may be of any known type. For example, in the illustrated embodiment, the relative movement generating means 117 is constituted by an electromagnetic induction device by which the lower extension 115b of the motor support member 115 (and accordingly the motor 114 and the information storing portion 110 connected thereto) is moved back and forth in the vertical direction by controlling electrical current applied to a coil (not shown) of the device. Preferably, the vertical back and forth movement is effected at a constant speed. The distance of the vertical movement is on the order of several hundred microns. Of course, in place of an electromagnetic induction device, other vertical movement means such as an air spring or the like may be utilized. An upper end portion 113a of the central shaft 113 is rotatably and slidably supported by a cover 118 through a metal bearing (not shown) or the like member.

In place of the information storing portion 110, the head portion 120 may be reciprocally moved with respect to the information storing portion 110 which is merely rotated. That is to say, there may be a relative back and forth movement between the information storing portion and the head portion.

Figure 11:
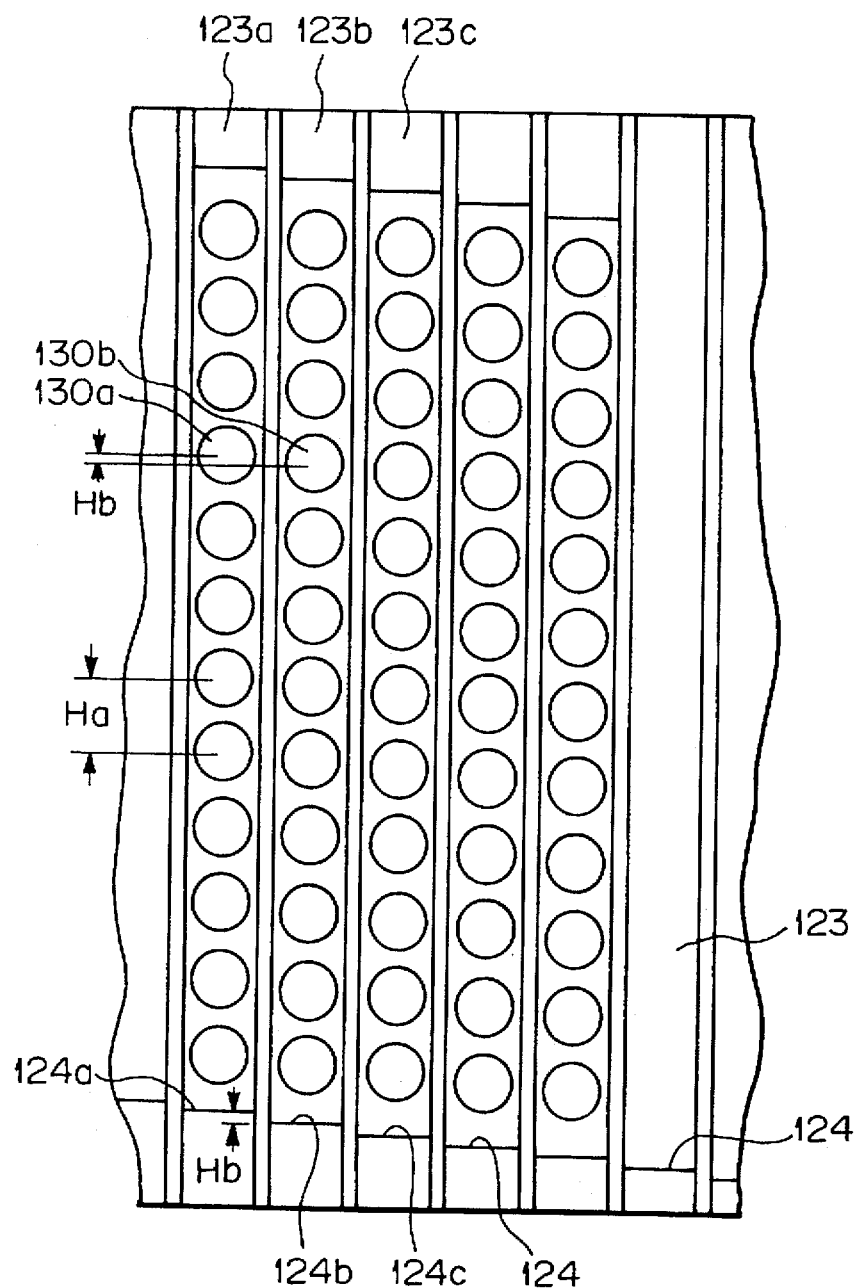
FIG. 11 is a developed view showing a portion of the inner peripheral surface of a head cylinder of the system of FIG. 10, with optical lens units mounted thereon.
Figure 12:
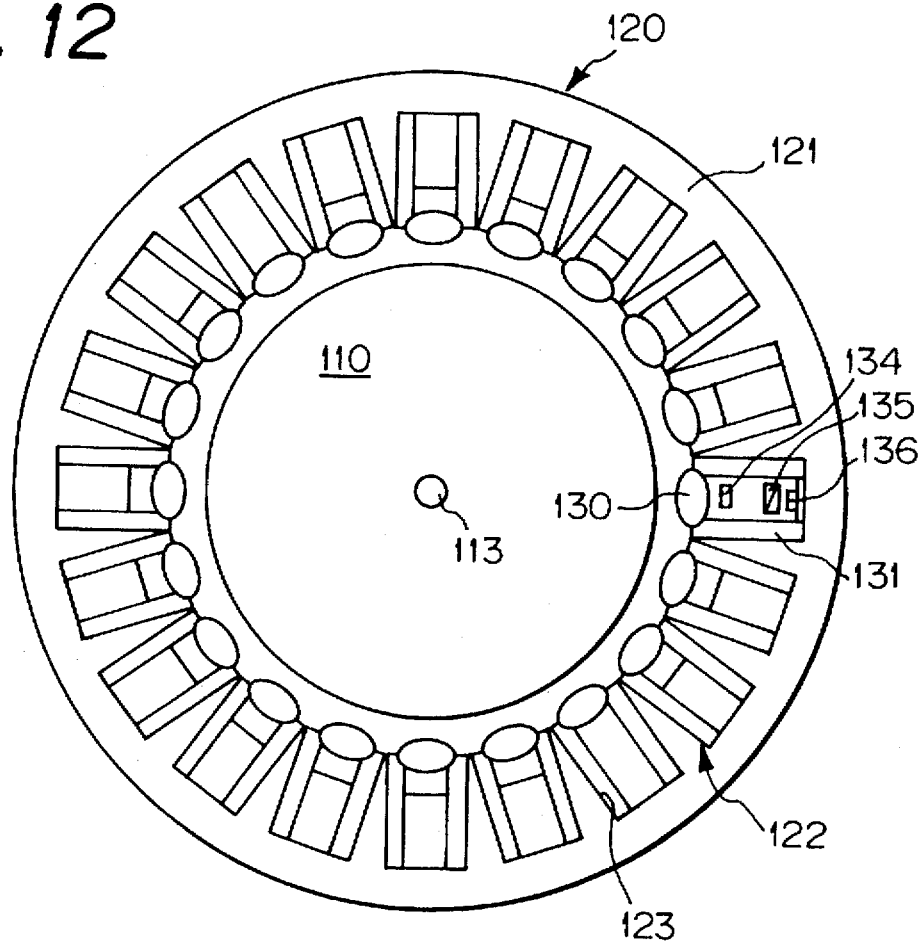
FIG. 12 is a sectional view taken along the line 12—12 in FIG. 10.

The head portion 120 includes a substantially cylindrical head cylinder 121 secured to the frame 116 and a plurality of optical lens units 122 adapted to be fixedly mounted on the head cylinder. As shown in FIGS. 11 and 12, the head cylinder 121 is provided at its inner surface with a plurality of vertical recesses or grooves (unit mounting portions) 123 which are equidistantly disposed along a circumferential direction and which are adapted to receive the respective optical lens units 122. Each of the vertical grooves 123 is provided at its lower end with an abutment portion (for example, a shoulder, projection, or a seat) 124 against which a lower end of the corresponding optical lens unit 122 abuts, thereby correctly positioning the optical lens unit. The details of the abutment portions 124 will be described later.

Figure 13A:
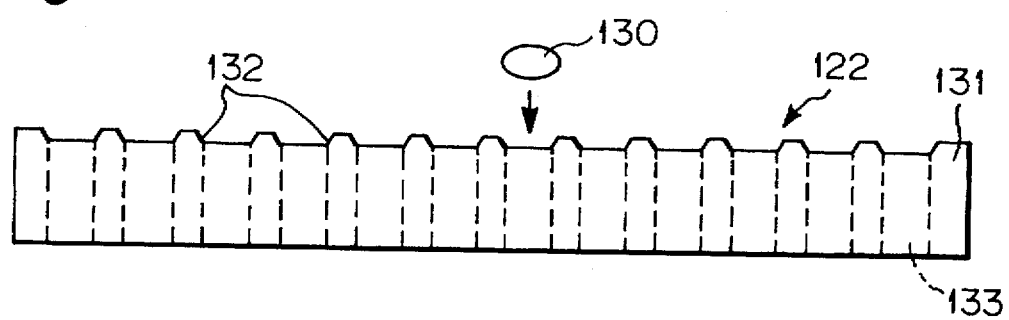
FIG. 13A is a side view of a housing of the optical lens unit.
Figure 13B:
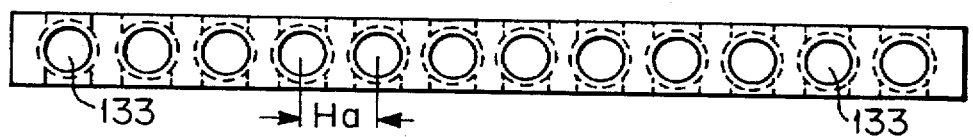
FIG. 13B is a bottom view of the housing.

As shown in FIGS. 13A and 13B, the optical lens unit 122 comprises a housing 131 assembled as an elongated box. The housing 131 is provided on its one surface with a plurality of equally spaced cup-shaped recesses 132 for receiving objective lenses 130, respectively, and each cup-shaped recess 132 has a central through hole 133 for permitting the passage of light. The assembling of the optical lens unit 122 is completed by mounting the lenses 130 in the cup-shaped recesses 132 and by arranging a coherent lens 134, a beam splitter 135, and a light emitting element (such as a semiconductor laser) 136 in an optically aligned condition within the housing 131. These elements 134, 135, 136 are schematically shown in FIG. 12 for a single optical lens unit 122, but the other optical lens units have the same construction. When the center-to-center distance between adjacent cup-shaped recesses 132 is Ha, the center-to-center distance between the adjacent objective lenses 130 is also Ha.

The abutment portions 124 provided at the lower ends of the vertical grooves 123 of the head cylinder 121 are positioned in the following manner. The abutment portion 124a of one vertical groove (for example, a left-side vertical groove 123a in FIG. 11) is situated above the abutment portion 124b of the right adjacent vertical groove 123b by a distance (step) of Hb in the vertical direction. Similarly, the abutment portion 124b of vertical groove 123b is situated above the abutment portion 124c of the right adjacent vertical groove 123c by a distance Hb in the vertical direction. The positional relations between the other abutment portions 124 is the same as the above. Accordingly, when the optical lens units 122 are properly positioned within the respective vertical grooves 123 of the head cylinder 121, the corresponding lenses 130 in the optical lens units 122 are disposed in a helical fashion along the circumferential inner surface of the head cylinder 121. As a result, all of the lenses 130 are disposed in a helical fashion around an outer peripheral surface of the photosensitive information storage layer 110a of the information storing portion 110 with a number of revolutions (turns). In this case, as is apparent from the above explanation, the center-to-center distance between two lenses (for example, lenses 130a, 130b in FIG. 11) situated adjacent to each other in the helical direction becomes Hb. The steps between the optical lens units 122 positioned side by side along the circumferential direction does not necessarily change at the constant value Hb. In this specification, any lens arrangements in which the lenses (lens units) are not aligned in the circumferential direction (including the illustrated helical lens arrangement) are referred to as helical arrangement. Accordingly, by adopting a helical lens arrangement, the number of information storing tracks on the information storage layer 110a which can be handled by a single lens is greatly reduced.

In this embodiment, each of the optical units has twelve lenses, but each optical unit may have any desired number of lenses. As the number of lenses is increased, the number of information storing tracks which should be covered by a single lens is reduced accordingly.

Since the reading and writing of information with respect to the information storage layer 110a of the information storing portion 110 is well-known, an explanation thereof will be omitted.

Next, a fourth embodiment of a high speed information read/write system 200 according to the present invention will be explained with reference to FIG. 14. The same elements as those of the third embodiment are designated by the same reference numerals and a detailed explanation thereof will be omitted.

Figure 14:
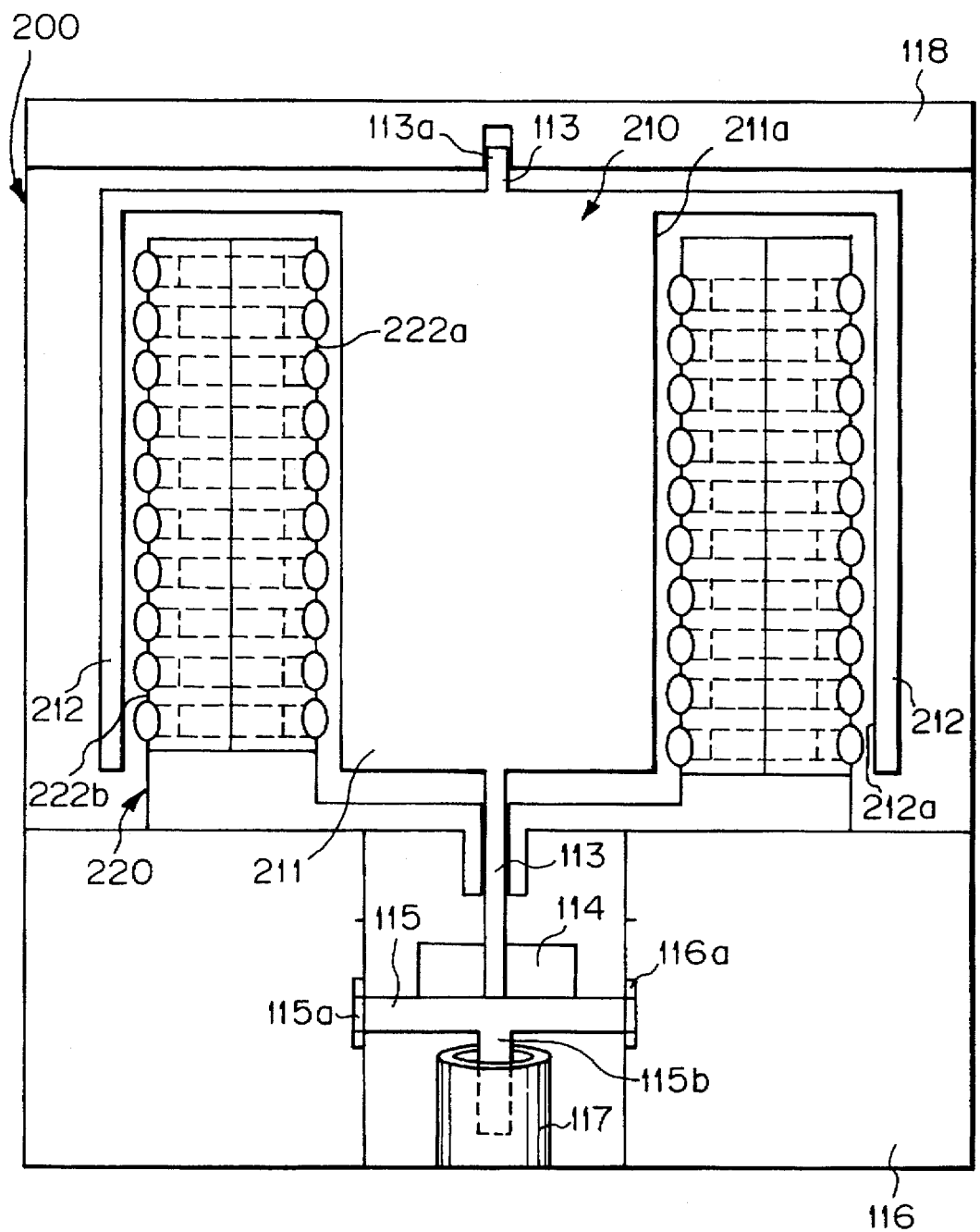
FIG. 14 is a sectional elevation of a fourth embodiment of a high speed information read/write system according to the present invention.

In the high speed information read/write system 200 shown in FIG. 14, an information storing portion 210 includes a first central information storage cylinder 211 secured to a central rotating shaft 113, and a second information storage cylinder 212 integrally formed with the first information storage cylinder and coaxially surrounding the latter. An outer peripheral surface of the first information storage cylinder 211 and an inner peripheral surface of the second information storage cylinder 212 are coated by photosensitive information storage layers 211a, 212a, respectively.

A head portion 220 includes a substantially cylindrical head cylinder 221 fixedly mounted on the frame 116 and disposed between the first and second information storage cylinders 211, 212, a first group of optical lens units 222a which are adapted to be fixedly mounted on the head cylinder 221 to oppose the photosensitive information storage layers 221a on the outer peripheral surface of the first information storage cylinder 211, and a second group of optical lens units 222b which are adapted to be fixedly mounted on the head cylinder 221 to oppose the photosensitive information storage layers 212a on the inner peripheral surface of the second information storage cylinder 212. Since the optical lens units 222a, 222b in the first and second groups may have the same construction as that of the above-mentioned optical lens unit 122, an explanation thereof will be omitted.

In this fourth embodiment, each of vertical grooves (corresponding to the vertical grooves 123 of the third embodiment) for receiving the optical lens units 222a, 222b is formed as a vertically elongated through passage extending between an inner and outer peripheral surface of the head cylinder 221. In this case, the first group optical lens unit 222a and the second group optical lens 222b are fixedly mounted back to back within the corresponding vertical passage (groove). The positional relation between the abutment portions of the vertical grooves in this fourth embodiment is the same as in the third embodiment. It should be understood that the vertical grooves for the first group of optical lens units 222a and the vertical grooves for the second group of optical lens units 222b may be provided independently.

In this fourth embodiment of a high speed information read/write system, since the area of the photosensitive information storage medium is greatly increased in comparison with the third embodiment, it is possible to treat a larger amount of information (twice as much or more) with substantially the same access time.

In the above-mentioned third and fourth embodiments, while the optical lens units are shown fixedly mounted within the vertical grooves (head mounting portions), the head mounting portions are not limited to vertical grooves, and may be flat surfaces, for example.

Furthermore, in the third and fourth embodiments, in place of the provision of the optical lens units, the optical head members (each including a lens and associated optical elements such as a laser) may be directly mounted on the head cylinder in a helical fashion.

By increasing the number of concentric information storage cylinders and by increasing the number of head cylinders accordingly, the amount of information which is treated by a single system can be freely increased. Furthermore, in the third embodiment, while the outer peripheral surface of the information storage portion 110 alone is used, an inner peripheral surface of the information storage portion alone (such as the second information storage cylinder 212 in the fourth embodiment), or both the inner and outer peripheral surfaces of the information storage portion may be utilized.

In all of the aforementioned embodiments, the information storage medium is photosensitive and the head portion is optically constructed, but a magnetic information storage medium or media may be used. In this case, in place of the optical head members (optical lens unit and the like), magnetic head members are used.

As mentioned above, according to the present invention, all of the head members (optical heads or magnetic heads) can easily and correctly be positioned with respect to the head cylinder (and accordingly the information storage portion) merely by fitting the head units (optical lens units or magnetic head units) into the vertical grooves of the head cylinder.

Furthermore, when optical lens units are used as the head units, since the construction and the assembly of the system can be simplified, the manufacturing cost of the system can be reduced greatly.

In addition, since the head members (optical heads or magnetic heads) are arranged in a helical fashion with respect to the information storage portion so that the number of information storing tracks on the information storage portion which are scanned by a single head is greatly reduced, by effecting the access operations of all of the heads simultaneously, the maximum access time per head (i.e., maximum waiting time during which all of the information storing tracks can be scanned) can be shortened greatly.

For example, if it is assumed that parameters (such as the number of lenses, the lens-to-lens distance, and the number of rotation, i.e., rotational speed of the information storage portion) are set so that a single head can scan a predetermined relatively large number of the information storing tracks in one second, when the amount of information corresponding to one movie is stored on the information storage medium of the system according to the present invention, the information fragments for one movie can be output repeatedly at intervals of one second. That is to say, the maximum waiting time for any user is merely one second. Accordingly, with the present invention, on-demand system can be realized by utilizing the existing infrastructures (telephone circuits, CATV and the like networks) by preparing one-second buffers for users. As an example, when the length of one movie is two hours (7200 seconds) and there are 32 frames/sec and 1000 records/frame, the total number of frames becomes 230,400 and the total number of records becomes 230,400,000. Further, as is common, each record is identified by numbers (ID, frame, record in movie). In the above case, since all of the records can be output within one second, any user can pick up any desired record within one second at any time. Even when the user interrupts the movie on the way, since the identifying numbers of the last picked-up record have been stored in the buffer, the user can re-start the movie at any time. The number of movies (the amount of information) among which the user can select can freely be increased by increasing the number of information storage media. Nevertheless, the maximum waiting time is unchanged.

What is claimed is:

1. A high speed information read/write apparatus comprising:
   a substantially cylindrical information storing means including at least one substantially cylindrical information storage cylinder having an information storage medium formed on a surface thereof;
   a head means including at least one head cylinder disposed coaxially with said information storage cylinder and having a plurality of head members helically mounted on a surface thereof;
   an information input/output means for outputting information to said information storage medium of said information storage cylinder through said head means and for inputting the information from said information storage medium through said head means; and
   a first drive means for rotating said information storing means; and
   a second drive means for producing relative movement of said information storage cylinder and said head cylinder in an axial direction of said information storage cylinder as said information storing means is rotating to enable said head members to access different regions of said information storage medium in the axial direction of said information storage cylinder.

2. An apparatus as claimed in claim 1 wherein each head member overlaps an adjoining one of the head members in an axial direction of the head cylinder.

3. An apparatus as claimed in claim 1 wherein the first drive means rotates the information storing means and the second drive means reciprocates the information storing means with respect to the head means in the axial direction of the information storing means.

4. An apparatus as claimed in claim 3 wherein the head members are mounted on the head cylinder in a helical fashion so that head members adjoining each other in a circumferential direction of the head cylinder partially overlap each other in the axial direction of the information storing means to minimize the number of information storing tracks to be scanned by each of the head members.

5. An apparatus as claimed in claim 4 wherein the head members are incorporated into a plurality of head units disposed side-by-side, the head cylinder having head mounting portions with abutment means provided on a surface thereof, the head mounting portions being adapted to mount the head units thereon in such a manner that when the head units are mounted on the head mounting portions to abut against the abutment means, all of the head members of the head units are disposed in the helical fashion with respect to the information storage medium of the information storage cylinder.

6. An apparatus as claimed in claim 3 wherein the head members are mounted on the head cylinder in a helical fashion so that the head members in each helical turn of the head members cover different information storing tracks in an axial zone of the information storage medium corresponding to the helical turn to minimize the number of information storing tracks to be scanned by each of the head members.

7. An apparatus as claimed in claim 6 wherein the head members are incorporated into a plurality of head units disposed side-by-side, the head cylinder having head mounting portions with abutment means provided on a surface thereof, the head mounting portions being adapted to mount the head units thereon in such a manner that when the head units are mounted on the head mounting portions to abut against the abutment means, all of the head members of the head units are disposed in the helical fashion with respect to the information storage medium of the information storage cylinder.

8. An apparatus as claimed in claim 1 wherein the first drive means rotates the information storing means and the second drive means reciprocates the head means with respect to the information storing means in the axial direction of the information storing means.

9. An apparatus as claimed in claim 8 wherein the head members are mounted on the head cylinder in a helical fashion so that head members adjoining each other in a circumferential direction of the head cylinder partially overlap each other in the axial direction of the information storing means to minimize the number of information storing tracks to be scanned by each of the head members.

10. An apparatus as claimed in claim 9 wherein the head members are incorporated into a plurality of head units disposed side-by-side, the head cylinder having head mounting portions with abutment means provided on a surface thereof, the head mounting portions being adapted to mount the head units thereon in such a manner that when the head units are mounted on the head mounting portions to abut against the abutment means, all of the head members of the head units are disposed in the helical fashion with respect to the information storage medium of the information storage cylinder.

11. An apparatus as claimed in claim 8 wherein the head members are mounted on the head cylinder in a helical fashion so that the head members in each helical turn of the head members cover different information storing tracks in an axial zone of the information storage medium corresponding to the helical turn to minimize the number of information storing tracks to be scanned by each of the head members.

12. An apparatus as claimed in claim 11 wherein the head members are incorporated into a plurality of head units disposed side-by-side, the head cylinder having head mounting portions with abutment means provided on a surface thereof, the head mounting portions being adapted to mount the head units thereon in such a manner that when the head units are mounted on the head mounting portions to abut against the abutment means, all of the head members of the head units are disposed in the helical fashion with respect to the information storage medium of the information storage cylinder.

13. An apparatus as claimed in claim 1 wherein the head members are mounted on the head cylinder in a helical fashion so that head members adjoining each other in a circumferential direction of the head cylinder partially overlap each other in the axial direction of the information storing means to minimize the number of information storing tracks to be scanned by each of the head members.

14. An apparatus as claimed in claim 13 wherein the head members are incorporated into a plurality of head units disposed side-by-side, the head cylinder having head mounting portions with abutment means provided on a surface thereof, the head mounting portions being adapted to mount the head units thereon in such a manner that when the head units are mounted on the head mounting portions to abut against the abutment means, all of the head members of the head units are disposed in the helical fashion with respect to the information storage medium of the information storage cylinder.

15. An apparatus as claimed in claim 1 wherein the head members are mounted on the head cylinder in a helical fashion so that the head members in each helical turn of the head members cover different information storing tracks in an axial zone of the information storage medium corresponding to the helical turn to minimize the number of information storing tracks to be scanned by each of the head members.

16. An apparatus as claimed in claim 15 wherein the head members are incorporated into a plurality of head units disposed side-by-side, the head cylinder having head mounting portions with abutment means provided on a surface thereof, the head mounting portions being adapted to mount the head units thereon in such a manner that when the head units are mounted on the head mounting portions to abut against the abutment means, all of the head members of the head units are disposed in the helical fashion with respect to the information storage medium of the information storage cylinder.

17. A high speed information read/write apparatus comprising:

an information storing means including a substantially cylindrical information storage cylinder having an information storage medium provided on a surface thereof;

head means including a head cylinder disposed coaxially with said information storage cylinder, and a plurality of head units each having a plurality of head members disposed side by side, said head cylinder being provided with head mounting portions with abutment means which are adapted to mount said head units thereon in such a manner that, when said head units are mounted on said head mounting portions to abut against said abutment means, all of said head members of said head units are disposed in a helical fashion with respect to said information storage medium of said information storage cylinder;

information input/output means for outputting information to said information storage medium of said information storage cylinder through said head means and for inputting information from said information storage medium through said head means; and first drive means for rotating said information storing means; and second drive means for producing relative axial movement of said information storage cylinder and said head cylinder in an axial direction of said information storage cylinder as said information storing means is rotating to enable said head units to access different regions of said information storage medium in the axial direction of said information storage cylinder.

18. An apparatus as claimed in claim 17 wherein each head member overlaps an adjoining one of the head members in an axial direction of the head cylinder.

19. A high speed information read/write apparatus comprising:

an information storage cylinder having a rotational axis and an information storage medium provided thereon;

a head cylinder coaxially disposed with respect to the information storage cylinder;

a plurality of heads for transmitting information with respect to the information storage medium mounted on the head cylinder in a helical pattern opposing the information storage cylinder;

first drive means drivingly connected to the information storage cylinder for rotating the information storage cylinder about its rotational axis;

second drive means for producing relative axial movement of the information storage cylinder and the head cylinder in an axial direction of the information storage cylinder as the information storage cylinder is rotating to enable the heads to access different regions of the information storage medium in the axial direction of the information storage cylinder; and an information input/output portion for inputting and outputting information with respect to the information storage medium through the heads.

20. An apparatus as claimed in claim 19 wherein each of the heads overlaps an adjoining one of the heads in an axial direction of the head cylinder.

21. An apparatus as claimed in claim 19 wherein the helical pattern extends around the head cylinder in a plurality of turns.

22. An apparatus as claimed in claim 21 wherein each of the heads is aligned with a plurality of the other heads in an axial direction of the head cylinder.

23. A high speed information read/write apparatus comprising:

a information storage cylinder having a rotational axis and an information storage medium provided thereon;

a head cylinder coaxially disposed with respect to the information storage cylinder and having a plurality of axially extending recesses formed in a surface thereof opposing the information storage cylinder;

a plurality of heads for transmitting information with respect to the information storage medium, each of the recesses having a plurality of the heads received therein, the head being arranged in a helical pattern extending around the head cylinder;

a first drive member drivingly connected to the information storage cylinder for rotating the information storage cylinder about its rotational axis;

a second drive member for producing relative axial movement of the information storage cylinder and the head cylinder in an axial direction of the information storage cylinder as the information storage cylinder is rotating to enable the heads to access different regions of the information storage medium in the axial direction of the information storage cylinder; and information input/output means for transmitting information with respect to the information storage medium through the heads.

24. An apparatus as claimed in claim 23 wherein axial ends of adjoining recesses in a circumferential direction of the head cylinder are staggered with respect to each other in the axial direction of the head cylinder such that the heads are arranged in the helical pattern extending around the head cylinder.

25. An apparatus as claimed in claim 24 including a plurality of elongated frames, each of the frames being received in one of the recesses and having a plurality of the heads mounted thereon.

26. An apparatus as claimed in claim 25 including an abutment disposed at an axial end of each of the recesses, each of the frames having an axial end abutting against one of the abutments, the abutments being arranged in a helical pattern extending around the head cylinder.

* * * * *